United States Patent [19]

Schreiner et al.

[11] Patent Number: 4,807,489
[45] Date of Patent: Feb. 28, 1989

[54] GEAR SHIFT DEVICE

[75] Inventors: Friedrich Schreiner; Otto Ebner, both of Meckenbeuren; Gerhard Buri, Friedrichshafen; Bernhard Grupp, Weingarten, all of Fed. Rep. of Germany

[73] Assignee: Zahnradfabrik Friedrichshafen AG, Friedrichshafen, Fed. Rep. of Germany

[21] Appl. No.: 848,043

[22] PCT Filed: Jul. 20, 1985

[86] PCT No.: PCT/EP85/00362
 § 371 Date: Mar. 21, 1986
 § 102(e) Date: Mar. 21, 1986

[87] PCT Pub. No.: WO86/00967
 PCT Pub. Date: Feb. 13, 1986

[30] Foreign Application Priority Data

Jul. 26, 1984 [WO] PCT Int'l Appl. ............ PCT/EP84/00230

[51] Int. Cl.[4] ............................................ B60K 20/00
[52] U.S. Cl. ............................................ 74/475; 74/527
[58] Field of Search .......................... 74/476, 475, 527

[56] References Cited

U.S. PATENT DOCUMENTS

| 3,533,301 | 10/1970 | Hausinger | 74/476 X |
| 3,937,100 | 2/1976 | Huffmann et al. | 74/476 |
| 3,939,724 | 2/1976 | Takahashi | 74/476 |
| 4,476,740 | 10/1984 | Ida et al. | 74/476 |
| 4,567,785 | 2/1986 | Reynolds | 74/475 X |
| 4,584,895 | 4/1986 | Holmes | 74/476 |

FOREIGN PATENT DOCUMENTS

| 3011131 | 10/1981 | Fed. Rep. of Germany . |
| 3141271 | 5/1983 | Fed. Rep. of Germany . |
| 7435734 | 6/1975 | France . |
| 7606311 | 10/1976 | France . |

OTHER PUBLICATIONS

International Search Report dated Oct. 29, 1986.

Primary Examiner—Andrew V. Kundrat
Attorney, Agent, or Firm—Herbert Dubno

[57] ABSTRACT

A gear shift device e.g. for a six-speed automotive speed change transmission with a gear shift lever for selection and shifting of all gears and with shift rails for the shifting of gears in one shift path has an H-shaped shift pattern similar to a four-speed transmission and has means for fixing or returning of a central selection and shift shaft or rotating shaft and/or the gear-shift lever into predetermined shift paths, e.g. the gears 3/4, where for the shift path of the gears 5/6 a retention device is provided additionally, which upon completed or nearly completed shift into the next higher, that is sixth gear, retains the central selection and shift shaft or the rotating shaft and/or the gear-shift lever in this shift path and upon completed or nearly completed shift into the next lower, that is fifth gear, permits the return of the central selector and shift shaft or the rotating shaft and/or the gear-shift lever into a lower shift path, e.g. the shift path of the gears 3/4, when the gear shift shaft is placed again into the neutral position. Thereby misshifts, e.g. from the sixth to the third gear are prevented due to the effective return device.

9 Claims, 6 Drawing Sheets

GEAR SHIFT DEVICE

CROSS REFERENCE TO RELATED APPLICATIONS

The present application is a national phase of PCT/EP85/00362 filed July 20, 1985 and based upon a PCT/EP84/0030 filed July 26, 1984 in Luxembourg under the International Convention.

FIELD OF THE INVENTION

Our present invention relates to a gear shift device and, more particularly, to a multispeed transmission having a set of high speed gears, usually fifth and sixth forward gears, a set of lower speed gears, usually third and fourth forward gears, and an H-shaped shifting path for the shift level between these positions with preferential return to a neutral position in the shift path of the third and fourth gears.

BACKGROUND OF THE INVENTION

Gear shift devices can have an H-shaped shift pattern and an automatic return of the gear shift lever, e.g. into the shift path of the gears 3/4 for 4-, 5- and six speed transmission, when the shift lever is placed in the neutral position. The shifting into a speed outside of the predetermined path requires of the driver, in addition of the movement of the gear shift lever in the direction of the gear preferentially in the direction of forward or reverse drive to evert pressure transverse to the direction of vehicle movement, e.g. into shift path 1/2 to the left and into shift path 5 or 5/6 to the right. These devices have proven themselves in 4- and 5- speed transmissions because they make it easy for the driver to find the correct shift path and the correct gear without forcing him to observe the position of the gear shift lever optically.

These arrangements have been successful with gear shift devices including transfer boxes with a double-H-shift pattern, where the return of the gear shift lever in the lower range, gears 1 to 4, occurs into the shift path of the gears 3/4 and after switching of the transfer box into the higher range of gears 5 to 8 into the shift path of the gears 5/6, and are a great relief for the driver.

In the case of 6-speed transmissions which are realized without transfer boxes, especially upon downshifting from the sixth gear, misshifts can easily occur when the driver, instead of engaging the 5th speed, engages the 3rd speed due to the return of the gear shift lever into the shift path of gears 3/4.

Such mistakes can lead to severe damage in the motor and the transmission at excessive speeds.

OBJECTS OF THE INVENTION

It is therefore the object of the invention to provide an improved gear shift device such that misshifts due to the return of the gear shift lever into predetermined shift paths is avoided, without placing higher demands on the driver, or abandoning the return into predetermined shift paths which in principle is advantageous.

This object is attained in a gear device for a multiple-speed gear, preferably a 6-gear or 6-speed automotive change gear transmission with a gear shift lever for selection and shifting of all gears with gear shift rails for shifting gears in a shift path with an H-shaped pattern similar to that of a 4-speed transmission and with means for returning the gear shift lever into a predetermined shift path wherein for one shift path, e.g. the shift path of gears 5/6, a retention device is provided additionally, which upon completed or nearly completed shift into the higher gear of this shift path, e.g. the 6th gear, retains the gear shift lever in this shift path, and upon completed or nearly completed shift into the lower gear of this shift path, e.g. the 5th gear, permits the return of the gear shift lever into a lower shift path, e.g. the shift path of the gears 3/4, when the gear shift lever is again moved into its neutral position.

A central selection and shift shaft can be arrayed between the gear shift lever and the shift rails or a rotating shaft which is retained by means of the gear shift lever or is returned into predetermined shift paths. For one shift path, e.g. that of the gears 5/6, a retention device is provided additionally which upon completed or nearly completed shift into the higher gear of this shift path, e.g. the 6th gear, retains the central selection and shift shaft or also rotating shaft and/or the gear shift levers in this shift path and upon a completed or nearly completed shift into the lower gear of this shift path, e.g. the 5th gear, permits the return of the central selector and shift shaft or the rotating shift and/or the gear shift lever into the lower shift path, e.g. that of the gears 3/4, when the gear shift lever is again moved into the neutral position.

SUMMARY OF THE INVENTION

The provision of a retention device, e.g. in the shift path of the gears 5/6, in addition to the generally known shift path return to the gear shift lever into the shift path of the gears e.g. 3/4, assures on the one hand the return for shifts into the lower gear, e.g. the 5th gear, while for shifts into the higher gear, e.g. 6th gear, the lever is retained in the shift path of the gears 5/6 under the influence of the retention device.

By positioning of the gear shift lever e.g. from 6th gear to neutral position, the shift path of gears 5/6 is retained, so that during further shifting, e.g. positioning of the gear shift lever into the engaged end position in forward direction, the 5th gear is engaged. But if due to further downshifting a positioning of the gear shift lever from the engaged position of the 5th gear towards neutral occurs, then the retention in shift path 5/6 is cancelled, and the return of the gear shift lever is effected into shift path of the gears 3/4. Thus, misshifts e.g. from gear 6 to gear 3, are prevented in a simple manner.

According to a feature of the invention the retention device uses springs are provided as return and/or retaining means.

The springs of the retention device can be overpowered by a relatively high selection force.

The retention device is arrayed upon a shift rail or upon a retention rail synchronously slidable with the central selector and shift shaft.

The retaining device can consist of a housing with a two-step bore placed transversely to the retaining rail, in which two bushings are arranged with a compression spring between them. A first of the bushing has its outwardly pointing bottom is formed spherically and cooperates with a cam curve on the shift path retention and for activation of the retention device is pressed backwards by the latter. The second bushing exhibits a cam curve on its outer bottom which cooperates with a corresponding cam curve of the retention rail and is activated via the compression spring. The relative motion between retention device on the one hand and the central selection and shift shaft as well as retention rail on the other is effected by a stop bolt fixedly arrayed in the transmission housing by fixing the retaining device approximately halfway from the neutral position to the two end positions of shift path 5/6.

By means of this relative motion the activation as well as the deactivation of retaining device is accomplished and the synchronous axial motion of the central selector and shift shaft and retaining rail is effected by means of a dog on the central selector and shift shaft. A dual shift finger can be fastened to a main shift shaft which cooperates with a retention device where the former protrudes into a slot of a slider plate which is so shaped that upon a shift into the lower gear of a shift path the slider plate is not translated and upon shifting into a higher gear of this shift path the dual finger translates the slider plate in the same direction. A slant slot of this slider plate translates a locking slider by means of a pin arranged in the latter, which is positioned in the same plane but transposed in the direction of motion by 90% with respect to the dual shift finger and the slider plate.

In this locking position, as well as in the initial position, the locking slider is held by a retention device equipped with a spring. The locking slider prevents the return of the gear shift lever into a lower shift path upon backshifting into neutral, but can be overcome by exertion of a high selective force. Only upon shifting into a lower gear of this shift path is the locking slider moved into the unlocked position via the slot and the slant slot of the slider plate and the pin, so that the gear shift lever upon shifting into the neutral position of this shift path is returned into the next lower one.

On the extended shift or rotating shaft as retaining device is provided with an annular groove on the rotating shaft and a swiveling retention lever which is a rest position protrudes into the annular groove.

The retention lever is journaled in a retention housing flanged onto a shift housing, has a recess which cooperates with the dog of rotating shaft, has a finger which in locked position protrudes into the annular groove of rotating shaft and exhibits two bores which a retaining device engages selectively, and where this finger is disposed in a plane transverse to rotating shaft.

In many gear shift devices it is expedient to insert between the gear shift lever and the shift rails additionally a central selector and the shift shaft or a rotating shaft which is then, e.g. in synchronism with the gear shift lever, retained in a predetermined shift path, or is guided into the latter. Thereby, the central selector and shift shaft can be realized as a so-called "rotary shaft" transverse to the shift rails, which is translated for selection and rotated for engagement like the main shift shaft, parallel to the shift rails, using a rotary selection motion and translation for engagement.

The application of the retention device in a transmission with a rotary shaft is particularly advantageous, because such transmissions are designed for higher capacity and inadmissible increases in speed must be prevented with absolute reliability.

When springs are used as a retention and return elements in the retention device, then adjustment is possible in singularly simple manner, giving ease of operation in addition to reliable function.

If on occasion, under certain driving conditions, e.g. uphill travel, downshifting directly from the 6th to the 4th or even 3rd gear is necessary, then this is possible when deliberate overpowering of the spring thresholds is permitted. Thus the retention device contributes not only to a considerable easing of gear shifting, but also to the safety and good shiftability of such a transmission. If an overpowering of the retention device is not desired, then it can be resisted by selection of the spring pretension, or other blocking means.

In all transmission arrangements where the 6th gear is positioned forward on the central selector and shift shaft, e.g. where there is a climbing gear and the 6th gear is a direct drive, the retention device can be placed in a simple manner on the shift rail of gears 5/6 because the central selector and shift shaft and the shift rails of gears 5/6 are translated synchronously, axially, when shifting gears into speeds 5 and 6.

If however the 6th gear is an overdrive and is so positioned that the normal shift pattern can only be attached by a reversal of movement, then it may be necessary to provide parallel to shift rail 5/6 a separate retention rail, which by means of a dog which is effective only in the selection position for shift path 5/6, synchronously moved with the central selector and shift shaft.

When the gears are interchanged with respect to the shift pattern no additional rail and/or reversal is necessary and, only a slider plate needs to be exchanged. When the locking slider is intentionally overpowered, no axial compponents arise on the shift shaft, because there is only swinging motion, and the double shift finger is utilized for several functions.

In the last embodiment where the retention device is arranged on the rotating shaft, for a change of the shift pattern if necessary, or an interchanged arrangement of the gears, it is only necessary to assemble the locking lever in a reversed orientation, or to provide a different shift shaft. Particularly advantageous is also the placement of the locking lever between two housings, or one housing and a housing cover, which makes it possible to arrange the friction arms in a swinging manner, and also permits a simple conformation of the retention lever which can be manufactured as a stamping.

BRIEF DESCRIPTION OF THE DRAWING

The above and other objects, features and advantages of my invention will become more readily apparent from the following description, reference being made to the accompanying highly diagrammatic drawing in which:

FIGS. 13 to 16 are several cross sections through the retention device of FIG. 12 in the region of the retention lever with:

SPECIFIC DESCRIPTION

The shift pattern for a 6-speed transmission (FIG. 1) has gears or speed positions 1/3/5 in the direction of forward motion of the vehicle, and gears or speed positions R/2/4/6 in the direction of reverse motion of the vehicle. This shift pattern can be reversed in the transmission itself, that is e.g. on the central selector and gear shift shaft, because of the journaling of the gear shift lever.

Figures 1, 2:
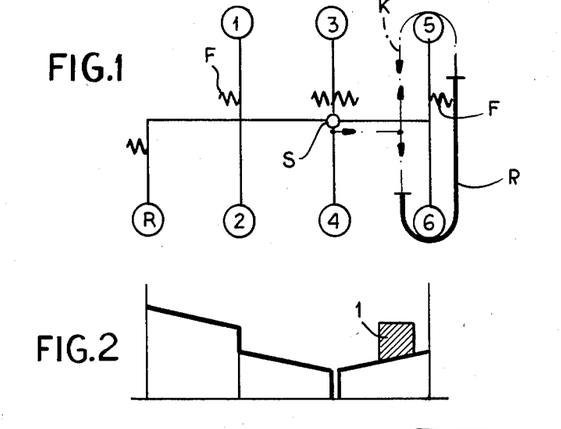
FIG. 1 is a shift pattern for a 6-speed transmission similar to the letter H.
FIG. 2 is a force curve for the shift pattern of FIG. 1.

The shift lever is designated with S and is shown in the rest and neutral position of the shift path of gears 3/4. If gear shift lever S is displaced in direction towards the shift path of gears 5/6, and in this shift path follows the curved path K, then no retention takes place in this shift path, while retention occurs in connection with motion in curve path R. This means that due to a motion of the gear shift lever from the neutral of shift path 3/4 to the neutral of shift path 5/6 and into engaged position of gear 5 and back into the neutral of shift path 5/6, the mechanical return of the gear shift lever into shift path 3/4 will always take place when the 5th gear is not engaged and when no shift pressure is exerted on the gear shift lever.

Only upon movement of the gear shift levers from the neutral of shift path 5/6 towards gear 6, about halfway through is a retention device activated which retains the gear shift lever and also the shift shaft in shift path 5/6, and thereby prevents a return motion into shift path 3/4. This happens also when the gear shift lever is moved from gear 6 in the direction towards neutral. Only as a consequence of a further motion, e.g. during a downshift towards gear 5, is the retention cancelled about halfway from neutral to gear 5, so that from this point on any automatic return motion of the gear shift lever occurs into shift path 3/4.

The return forces acting on the individual shift paths in neutral position are shown diagrammatically in the overall shift pattern in form of springs F.

FIG. 2 shows the force curve for the overall shift pattern of FIG. 1. As can readily be seen, the gear shift lever, in a non-engaged position, always tends to move towards shift path 3/4, and there always assumes a rest position in neutral, if the return from shift path 5/6 is not prevented by retention device 1, 6 or 7 in the manner described.

Figure 3:
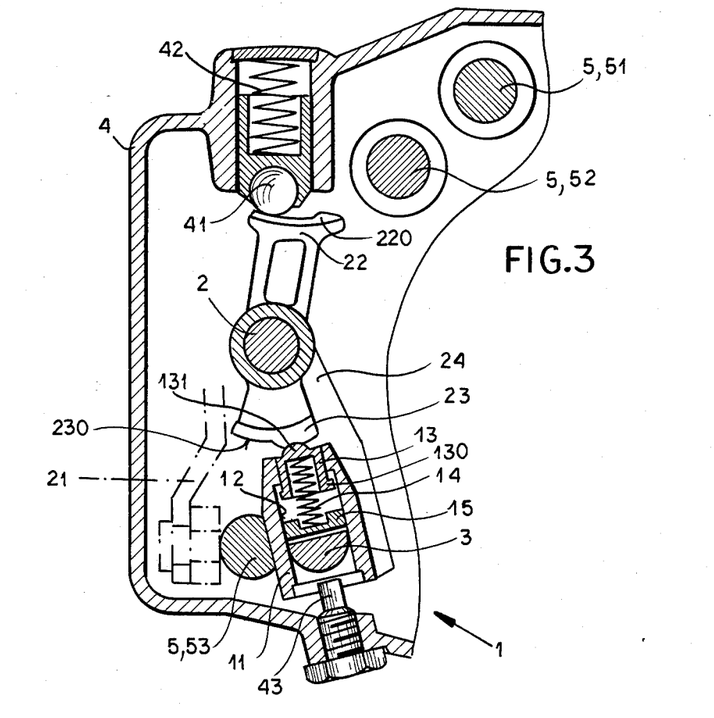
FIG. 3 is a cross section through a gear shift device in the area of the retention device of a first embodiment.
Figures 4, 5:
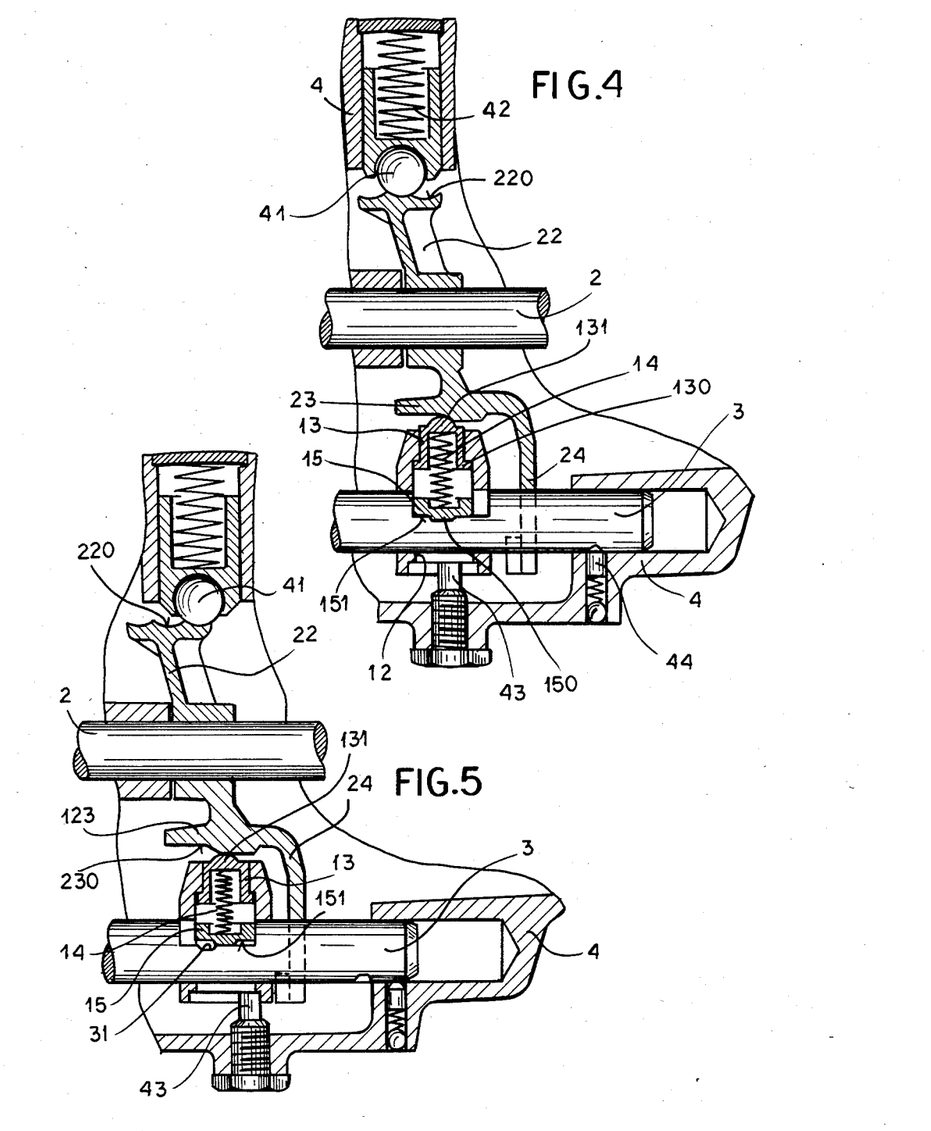
FIG. 4 is a longitudinal section through the device of FIG. 3 the selected neutral position of shift path 5-6 without retention.
FIG. 5 is a view similar to FIG. 4, but with 6th gear engaged, and with retention in shift path 5/6.

As can be seem from FIGS. 3 and 4, in addition to the transfer levers on the central selector and shift shaft 2, which are capable of engaging the shift shaft or shift rail 5 for selection of or speeds R; 1/2; 3/4; 5 and 6 by means of rotation of this selector and shift shaft 2 directly or via a reversal lever 21, a shift retention lever 22, a shift path retainer 23 and a dog 24 fixed against rotation and translation are all mounted on shaft 2. An indexing or detent ball 41 retained in transmission housing 4 is urged by a compression spring 42 against a retention cam curve 220 of shift retention lever 22. Upon a retention rail 3 parallel to the shift rail 5 for gears 5/6 the retention device 1 cooperates with shift path retainer 23 and a stop bolt 43 fastened in transmission housing 4. The retention device 1 itself consists of a housing 11 on retention rail 3 fixed against rotation thereon, and translatable, with a two-step bore 12 transverse to retention rail 3.

A bushing 13, shaped spherically on its face, is urged radially outwards by a compression spring 14, and is held in the first step of bore 12 by protruding neck 130, so that there is a gap between the sperical formation 131 at the end of the bushing 13 and the shift path retainer 23. The compression spring 14 acts radially inwards upon a second bushing 15, which has upon its outwardly facing bottom a cam curve 151. This can cooperate with a cam curve 31 of the retention rail. In the area of the second step of bore 12, there also acts the stop bolt 43 fastened in transmission housing 4, and the retention rail 3 is held in the neutral position, that is between 5th and 6th gear, by means of a spring-loaded retention pin 44 also arrayed in the transmission housing 4.

Figures 6, 7, 8:
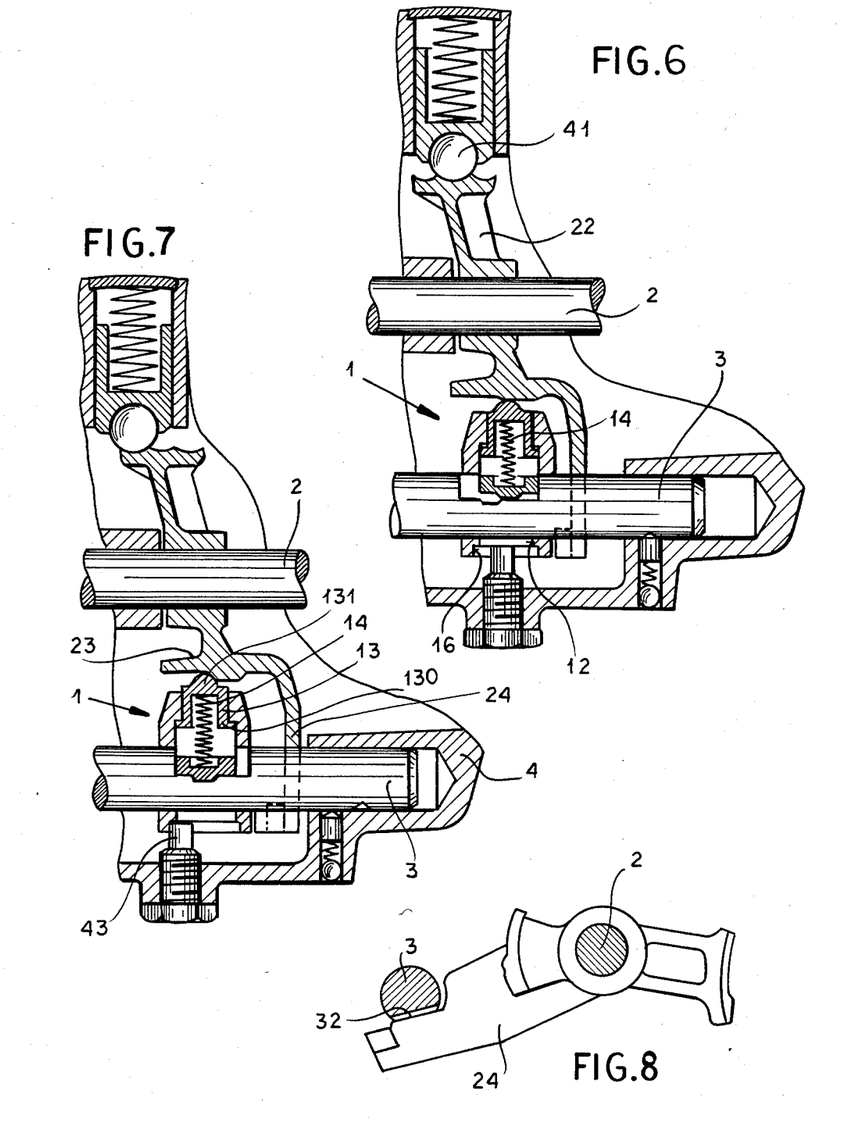
FIG. 6 is a view similar to FIG. 4, showing shift from gear to neutral in shift path 5/6 with retention.
FIG. 7 is a view similar to FIG. 4, with 5th gear engaged and no retention in shift path 5/6.
FIG. 8 is a section along line VIII—VIII of FIG. 7.

The FIGS. 5, 6 and 7 correspond to FIG. 4, but show different shift positions. FIG. 8 shows the engagement of dog 24 in a groove of retention rail 3 when the central selection and shift shaft 2 is swiveled into the position which corresponds to the shift path for the gears or speeds 5/6.

The retention device operates as follows:

In the position of FIG. 4, the gear shift lever and therewith the central selection and shift shaft 2 and also the retention rail 3 are in the neutral position of shift path 5/6. There is play between the shift retainer 23 and the spherical formation 131 of bushing 13. The dog is engaged in the groove 32 of the retention rail 3 (FIG. 8). In this position the retention device does not act and the gear shift lever and the central selection and shift shaft 2 is returned into the neutral and original position of shift path 3/4 if no shifting pressure is exerted (FIGS. 1, 2).

In FIG. 5 the central selection and shift shaft 2 is moved to the left and the 6th gear is engaged. The dog 24 has taken along the retention rail 3 by about the same extent, whereby the retention device 1 has been held fast at about half this path length by the stop bolt 43. Due to the relative motion of the retention rail with respect to the retention device the spring 14 is activated via cam curves 31, 151 and the second bushing 15, whereby at the same time via spherical conformation 131 the bushing 13 is depressed from its immobilized position via the cam curve 230. Now, equilibrium prevails on shift retention lever 22, and the gear shift lever remains in this position with gear 6 engaged and at the same time retention is achieved for shift path 5/6, so that upon a motion of the gear shift lever in direction towards neutral it is retained in shift path 5/6. FIG. 6 shows this shift position. The central selection and shift shaft 2 and synchronously therewith the retention rail 3 and the retention device is moved to the right and is held in the neutral position by the ball 41 in conjunction with shift retention 22. A return of the gear shift lever into the neutral position of shift path 3/4 does not take place because retention device 1 is still active, i.e. the compression spring 14 is still activated and there has been no relative movement between members 3 and 22.

If the shifting motion is continued beyond the "neutral" position in direction towards the 5th gear, then retention is maintained until the retention device 1 is kept from translating by step 16 of the two-step bore 12 via the stop bolt 43 fastened to transmission housing 4. One-half shifting path from neutral towards gear 5. Since the central selection and shift shaft 2 and the retention rail 3 are carried further via dog 24 to the shift position shown in FIG. 7 which corresponds to the engaged 5th gear, there occurs the relaxation of spring 14. The bushing 13 is restrained on protruding neck 130, and there is play between the spherical formation 131 of bushing 13 and the shift path retention 23, as already described in FIG. 4. The force equilibrium on the shaft retention rod is ended, and the central selection and shift shaft 2 and the gear shift lever are returned into shift path 3/4 as the gear shift lever is returned to the neutral position of FIG. 4.

A further gear shift device with retention device 6 is shown in FIGS. 9 to 11A, which cooperates with a shift finger 201 fastened to the main shaft 20. It is thereby possible to fasten the retention device 6 on the transmission or the shift housing or, as shown, on a shift rail. The eight shift positions shown are taken by a double shift finger 201 and correspond to the shift paths 5/6 shown in heavy lines 3/4: 1/2 as well as R-gear (reverse). The double shift finger effects the translation of the shift rails for shifting gears, the blocking of the shift rails not taking part in the shifting as well as the retention, e.g. of the shift path of gears 5, 6.

Figures 9, 9A:
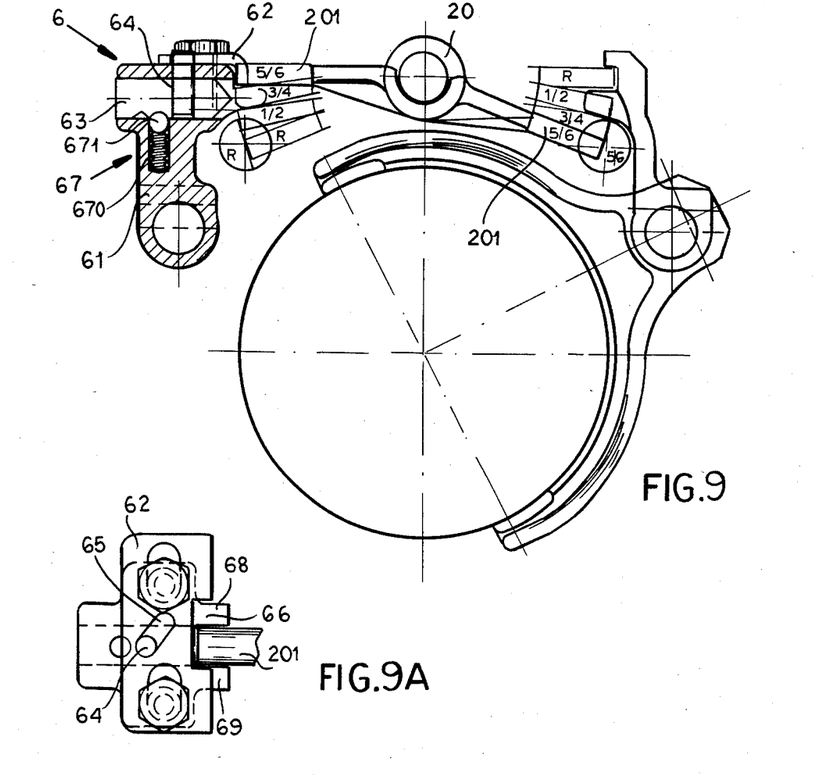
FIG. 9 is an elevational view of a further gear shift device with locking slider and slider plate in conjunction with shift fingers on the main shift shaft, partly shown in section.
FIG. 9A is a top view of the gear shift arrangement of FIG. 9.

The retention device 6 itself consists of the housing 61, the slider plate 62, the blocking slider 63 and the pin 64 connected to the blocking slider, which is moved via a slanted slot 65 in the slider plate and thus positions the blocking slider 63. The slider plate has an additional slot 66 into which shift finger 201 is engaged only in the shift path position of the gears 5/6 in such manner that upon translation of the shift finger into the lower gear of the shift path, e.g. 5th gear the slider plate is not displaced, and upon translation into the higher gear, e.g. the 6th gear, the slider plate 62 is translated by about the same distance and in the same direction. An additional retention device 67 is provided for the retention of the end positions of locking slider 63. Cogs 68 and 69 prevent a rotation of the main shaft 20 when the 5th or 6th gear is engaged.

The retention device 6 according to FIGS. 9 to 11A operates as follows:

According to FIG. 9, the main shift shaft 20 and the double shift finger 201 are in the position shown in heavy lines, and engage on the one side the shift rail of the gears 5/6 and on the other extend into the effective area of retention device 6, and lie in the shift path of the gears 5/6 in neutral position.

Figures 10, 10A:
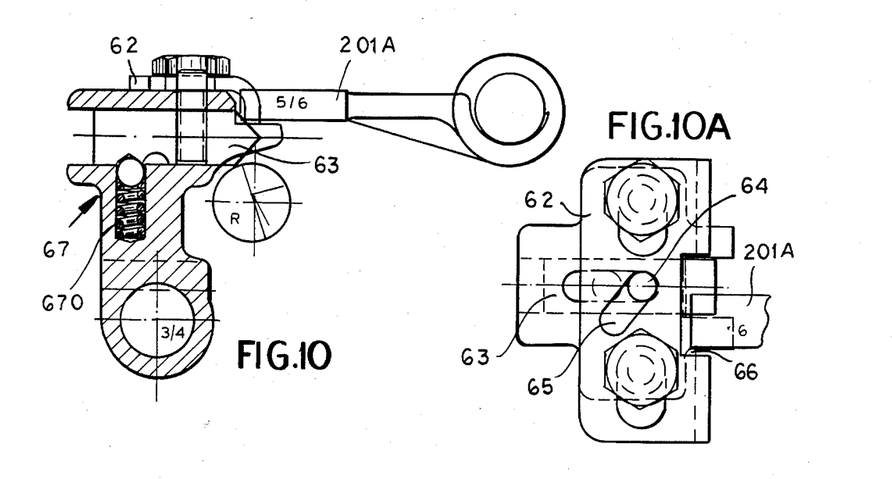
FIGS. 10 and 10A are views similar to a gear shift arrangement after FIGS. 9 and 9A, but with the 6th gear engaged.

Upon shifting into the lower gear of the shift path, in this example the 5th gear, main shaft 20 is translated and via the double shift finger the shift rail 5/6 is translated also. Since the slot 66 of slider plate 62 in this shift position (upwards in FIG. 9A) is large, the retention device is not actuated, and upon a shift back into neutral the gear shift lever and the main shaft 20 are returned into the shift path of the gears 3/4. Upon shifting from the same initial position according to FIGS. 9 and 9A into a higher gear, however, the shift finger 201 of the slider plate 62 and the locking slider 63 assume the position shown in 10A.

This shift finger 201A has translated the slider plate 62 (FIG. 10A) via the lower outline of slot 66 and thus brought pin 64 via slant slot 65 and thus locking slider 63 into locking position, whereby locking slider 63 is retained in this position by retention device 67 (FIG. 10) which has a lost motion detent action with respect to slider 63.

Figure 11:
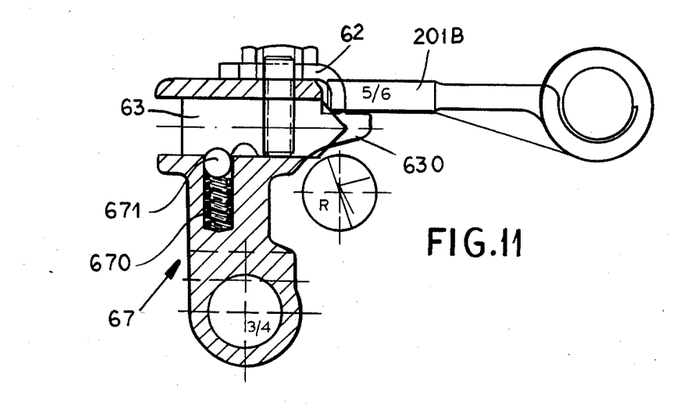
FIGS. 11 and 11A are views similar to FIGS. 9 and 9A in neutral position with blocked return in shift path.
Figure 11A:
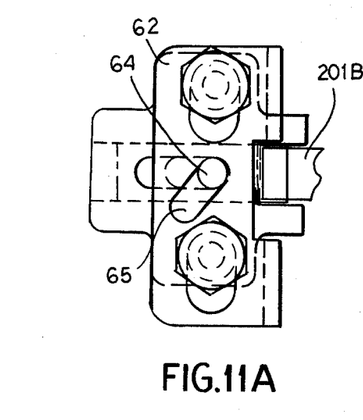

Upon movement of the gear shift lever from 6th gear into neutral position of this shift path the locking slider 63 continues to act, as FIGS. 11 and 11A show, and the gear shift lever is retained in this shift path, because due to the size of slot 66 on the slider plate 62 and the action of the retention device 67 the slider plate 62 is not translated. But in this position it is also possible by exertion of a suitable shift force in direction of the shift path of gears 3/4 to overcome the locking action, and to shift, if necessary, into gears 4 and also 3. Thereby, due to swinging of the main shift shaft 20, a force acts upon incline 630 of locking slider 63 and the spring 670 of the retention device 67 is overcome by ball 671 and the locking slider 63 is moved out of the locking position. Normally, however, there is a downshift from the 6th to the 5th gear, so that the slider plate 62 is translated by shift finger 210B, and the slant slot 65 unlocks locking slider 63 via pin 64. Upon a shift from the 5th gear into neutral there is a return of the gear shift lever into shift path 3/4.

Figure 12:
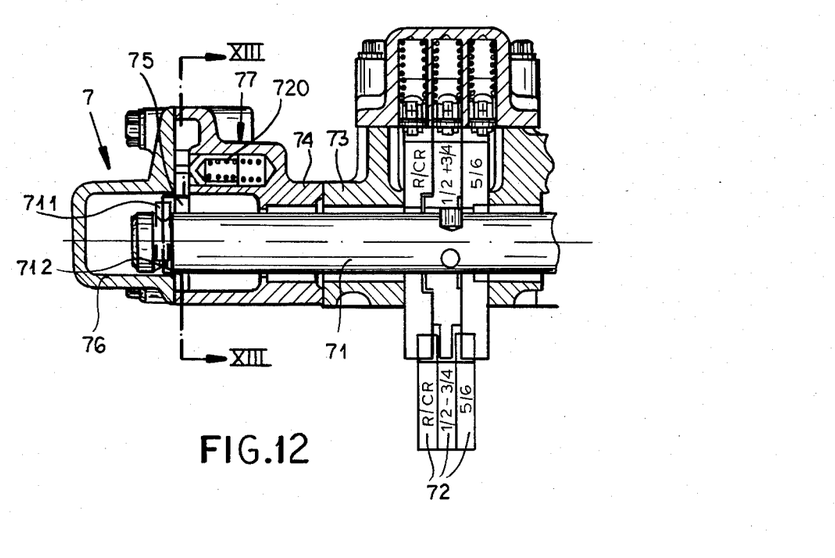
FIG. 12 is a section through a gear shift device with a retention device with retention lever on a rotating shaft.
Figures 14, 15, 16:
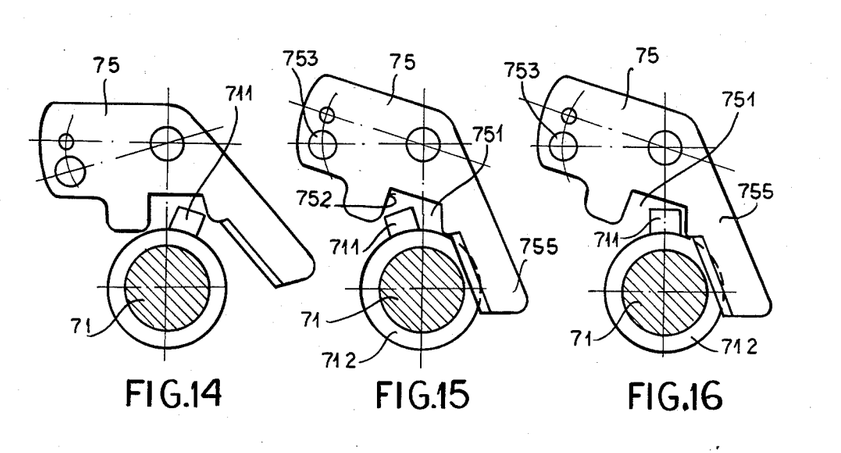
Figure 17:
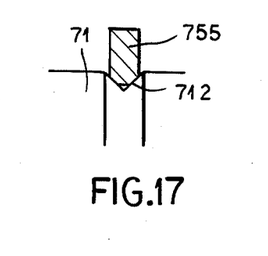
FIG. 17 is a section through the finger of the retention lever in the area of the groove in the rotating shaft.

FIG. 12 shows a gear shift device where the retention device 7 is positioned on the shift or rotating shaft 71 which is transverse to the transmission shaft and the shift rails 72. The rotating shaft 71, always present, is merely lengthened, and carries a dog 711 adjacent an annular groove 712. The plane of the groove and dog is seen in FIG. 12 to be shifted slightly to the left of the plane of the lever 75. It can be journaled additionally in the retention housing 74 which is flanged onto shift housing 73. Between this retention housing 74 and a cover 76 mounted on the front end, retention lever 75 is journaled in a swivelling manner and can be retained in two positions by means of a retention device or detent 77. The retention lever 75 has a recess 751 of such size that upon a shift into a lower gear the dog 711, which at the same time moves circumferentially, does not make contact (FIG. 14). However, upon a shift into a higher gear the retention lever 75 is taken along (rotated) on a contact surface 752 and retained by engagement of the retention device or detent 77 in a bore 753 with a stronger retention action (FIG. 15). Thereby finger 755 of the retention lever 75 protrudes into the annular groove 712 of rotation shaft 71 and retains it in this plane. After shifting back from the higher gear (e.g. the 6th gear) in this shaft path into neutral position the retention lever remains, due to the retention, in the position assumed and thus prevents the normally provided return of the rotating shaft into the plane of shift path 3/4 (FIG. 16). Only by exertion of a high selective force can the detent force of the retention device be overcome, and the finger 755 is pressed out of the annular groove 712 via its vertical walls for a forcible return shift.

Figure 13:
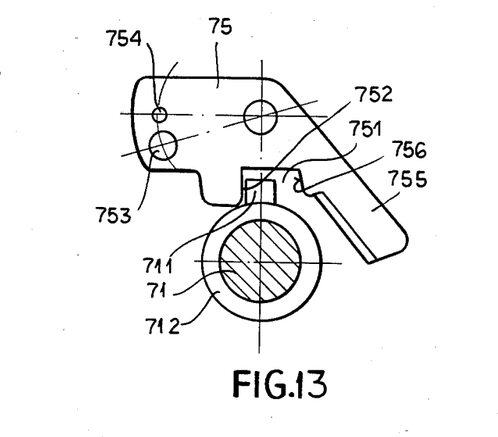
FIG. 13 showing the neutral position of shift path 5/6 selected from the lower shift path or shifted from a lower gear, FIG. 14 showing the position in which the lower gear is engaged, FIG. 15 showing the position in which the higher gear is engaged, and FIG. 16 showing the neutral position shifted back from the higher gear.

In the normal case however, only downshifting, e.g. into the 5th gear, will the retention lever 75 be pushed into its initial position via dog 711 (by contact with)

contact surface 756. Thereby the retention in the shift path is released, and the position of FIG. 13 is attained again.

We claim:

1. A gear shift device for a multispeed transmission having a set of low-speed gears with a neutral position therebetween along a first shift path between said low-speed gears, a set of high-speed gears with a neutral position therebetween along a second shift path between said high-speed gears, and a gearshift lever shiftable along a generally H-shaped shifting path between said gears and said neutral positions said first and second shift paths being perpendicular to a path connecting said first and second shift paths, said device comprising:
   a member displaceable by said lever upon its movement between said gears and said positions for operating said transmission to select a gear thereof, said member being normally returned to said neutral position of said set of low-speed gears; and
   a retention device including detent means acting on said member and constructed and arranged upon displacement of said member toward a higher speed one of said high-speed gears to retain said member in a position in which said lever is held in said second shift path upon its release by an operator of the transmission, and upon displacement of said member toward a lower speed one of said high-speed gears to release said member and permit said lever to return to said first shift path upon its release to said neutral position of said second shift path.

2. A gear shift device for a six-speed transmission having a reverse R-gear, first and second forward gears in one shift path, a set of low-speed gears forming third and fourth forward gears with a neutral position therebetween along a first shift path between said low-speed gears, a set of high-speed gears forming fifth and sixth forwards gears with a neutral position therebetween along a second shift path between said high-speed gears, and a gear-shift lever shiftable along a generally H-shaped shifting path between said sets of gears and said neutral positions, said device comprising:
   a member displaceable by said lever upon its movement between said gears and said positions for operating said transmission to select a gear thereof, said member being normally returned to said neutral position of said set of low-speed gears; and
   a retention device including detent means acting on said member and constructed and arranged upon displacement of said member toward said sixth gear to retain said member in a position in wich said lever is held in said second shift path upon its release by an operator of the transmission, and upon displaceme of said member toward said fifth gear to release said member and permit said lever to return to said first shift path upon its release to said neutral position of said second shift path.

3. The gear shift device defined in claim 2 wherein said member is a gear-shifting shaft and said retention device includes spring means acting upon said detect means.

4. The gear shift device defined in claim 3 wherein said spring means are dimensioned so as to be forceably overcome by a manual displacement of said lever from said second shift path toward said first shift path.

5. A gear shift device for a six-speed transmission having a reverse R-gear, first and second forward gears in one shift path, a set of low-speed gears forming third and fourth forward gears with a neutral position therebetween along a first shift path between said low-speed gears, a set of high-speed gears forming fifth and sixth forwards gears with a neutral position therebetween along a second shift path between said high-speed gears, and a gear-shift lever shiftable along a generally H-shaped shifting path between said sets of gears and said neutral positions, said device comprising:
   a member displaceable by said lever upon its movemen between said gears and said positions for operating said transmission to select a gear thereof, said member being norm returned to said neutral position of said set of low-speed gear and
   a retention device including detent means acting on said member and constructed and arranged upon displacement of said member toward said sixth gear to retain said member in a position in which said lever is held in said second shift path upon its release by an operator of the transmission, and upon displacement of said member toward said fifth gear to release said member and permit said lever to return to said first shift path upon its release to said neutral position of said second shift path said retention device including a rail provided with said detent means and said member is a shifting shaft synchronously slidable with said rail.

6. The gear shift device defined in claim 5 wherein said retaining device comprises a housing formed with a two-step bore extending transversely to said rail, a pair of bushings received in said housing and biased away form one another by a compression spring disposed between said bushings, one of said bushings having a spheroidal surface cooperating with a cam on a retainer lever axially and angularly fixed to said shaft and displaceable into said housing when said detect is effective to hold said gear-shift lever in said second shift path, the other of said bushings being formed with a cam cooperating with a cam on said rail, a stop bolt engageable with said housing limiting its displacement along said rail to a region approximately half way between the displacement of said retaining lever between fifth and sixth gear positions thereof, and a dog on said retaining lever engageable with said housing for synchronous displacement of said rail with said shaft.

7. A gear shift device for a six-speed transmission having a reverse R-gear, first and second forward gears in one shift path, a set of low-speed gears forming third and fourth forward gears with a neutral position therebetween along a first shift path between said low-speed gears, a set of high-speed gears forming fifth and sixth forwards gears with a neutral position therebetween along a second shift path between said high-speed gears, and a gear-shift lever shiftable along a generally H-shaped shifting path between said sets of gears and said neutral positions, said device comprising:
   a member displaceable by said lever upon its movement between said gears and said positions for operating said transmission to select a gear thereof, said member being normally returned to said neutral position of said set of low-speed gears; and
   a retention device including detent means acting on said member and constructed and arranged upon displacement of said member toward said sixth gear to retain said member in a position in which said lever is held in said second shift path upon its release by an operator of the transmission, and upon displacement of said member toward said fifth gear to release said member and permit said lever to return to said first shift path upon its release to said neutral position of said second shift path member by a shaft having a shift finger affixed thereto and cooperating with said retention device, said retention device comprising a slider plate formed with a slot and constructed and arranged so that upon displacement of said shift lever into fifth gear, said plate is not translated but upon displacement of said lever into sixth gear, said plate is translated by said finger engaging in said slot, said plate being formed with an inclined slot receiving a pin connected to a slider coplanar with said finger and said plate but having a direction of movement lying substantially at 90° to the direction of translation of said plate and positioned to lock said member against displacement, said detent means including a spring-loaded detent member engageable with said slider but displaceable upon forced displacement of said gear-shift lever to retain said member in said second shift path unless said detent member is forced by movement of said gear shift lever toward said first gear path.

8. A gear shift device for a six-speed transmission having a reverse R-gear, first and second forward gears in one shift path, a set of low-speed gears forming third and fourth forward gears with a neutral position therebetween along a first shift path between said low-speed gears, a set of high-speed gears forming fifth and sixth forwards gears with a neutral position therebetween along a second shift path between said high-speed gears, and a gear-shift lever shiftable along a generally H-shaped shifting path between said sets of gears and said neutral positions, said device comprising:

a member displaceable by said lever upon its movement between said gears and said positions for operating said transmission to select a gear thereof, said member being normally returned to said neutral position of said set of low-speed gears; and a retention device including detent means acting on said member and constructed and arranged upon displacement of said member toward said sixth gear to retain said member in a position in which said lever is held in said second shift path upon its release by an operator of the transmission, and upon displacement of said member toward said fifth gear to release said member and permit said lever to return to said first shift path upon its release to said neutral position of said second shift path said member by a rotatable shaft and said retention device including a pivotable lever engageable in an annular groove of said shaft and having a finger projecting into said groove for retention of said member in said position in which said gear shift lever is held in said second shift path, said detent means including a detent engageable with said pivotable lever, said shaft having a member engageable with said pivot lever to swing the same into said groove in one pivoting direction of said shaft and into said groove in another pivoting direction of said shaft.

9. The gear shift device defined in claim 8 wherein said pivotable lever is journaled in a retention housing mounted on a housing of said transmission.

* * * * *